US012658648B2

(12) United States Patent
Zhao et al.

(10) Patent No.: US 12,658,648 B2
(45) Date of Patent: Jun. 16, 2026

(54) ELECTRICAL CONNECTOR WITH AN IMPROVED SHIELDING TUBE

(71) Applicants: FOXCONN (KUNSHAN) COMPUTER CONNECTOR CO., LTD.; FOXCONN INTERCONNECT TECHNOLOGY LIMITED

(72) Inventors: Xia Zhao, Kunshan (CN); Jian-Kuang Zhu, San Jose, CA (US); Xiao-Gao Yang, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 376 days.

(21) Appl. No.: 18/196,585

(22) Filed: May 12, 2023

(65) Prior Publication Data

US 2024/0186752 A1 Jun. 6, 2024

(30) Foreign Application Priority Data

May 14, 2022 (CN) ......................... 202210525104.9
May 14, 2022 (CN) ......................... 202221154547.3

(51) Int. Cl.

| | |
|---|---|
| ***H01R 13/6581*** | (2011.01) |
| ***H01R 13/502*** | (2006.01) |
| ***H01R 13/6592*** | (2011.01) |

(52) U.S. Cl.

CPC ....... *H01R 13/6581* (2013.01); *H01R 13/502* (2013.01); *H01R 13/6592* (2013.01)

(58) Field of Classification Search

CPC .............. H01R 13/6581; H01R 13/502; H01R 13/6592; H01R 13/506; H01R 13/646; H01R 43/28

USPC .................................................... 439/607.01

See application file for complete search history.

(56) References Cited

U.S. PATENT DOCUMENTS

| | | | | |
|---|---|---|---|---|
| 6,439,931 | B1 * | 8/2002 | Niitsu .................. | H01R 13/658 439/660 |
| 6,802,746 | B2 * | 10/2004 | Carranza ................ | H01R 24/84 439/701 |
| 10,978,832 | B1 * | 4/2021 | Schroll .................. | H01R 24/44 |
| 11,011,875 | B1 * | 5/2021 | Schroll .............. | H01R 13/5804 |
| 2011/0201228 | A1 * | 8/2011 | Schumacher ...... | H01R 13/6593 439/527 |

(Continued)

FOREIGN PATENT DOCUMENTS

| | | |
|---|---|---|
| CN | 215645260 U | 1/2022 |
| CN | 112201979 B | 3/2022 |

(Continued)

*Primary Examiner* — Peter G Leigh

(74) *Attorney, Agent, or Firm* — Ming Chieh Chang

(57) ABSTRACT

An electrical connector includes: a first housing defining a front face and a rear face and two holes running through the front face and the rear face; a pair of terminals received in the holes respectively and extending forward but behind the front face of the first housing; and a first shielding tube fitly surrounding the first housing; wherein the first shielding tube defines a front distal portion located in front of the front face of the first housing, and the front distal portion shrinks gradually and becomes smaller in diameter.

14 Claims, 23 Drawing Sheets

(56) References Cited

U.S. PATENT DOCUMENTS

| | | | | |
|---|---|---|---|---|
| 2013/0052866 | A1* | 2/2013 | Il | H01R 13/6581 439/607.41 |
| 2019/0173243 | A1* | 6/2019 | Annequin | H01R 13/6473 |
| 2019/0288458 | A1* | 9/2019 | Lödding | H01R 13/6581 |
| 2020/0076179 | A1 | 3/2020 | Pichlmaier et al. | |
| 2021/0057854 | A1* | 2/2021 | Droesbeke | H01R 9/0518 |
| 2021/0159644 | A1* | 5/2021 | Evans | H01R 13/6477 |
| 2021/0257786 | A1* | 8/2021 | Evans | H01R 13/6581 |
| 2022/0052494 | A1 | 2/2022 | Maesoba et al. | |

FOREIGN PATENT DOCUMENTS

| | | | | |
|---|---|---|---|---|
| EP | 3001512 | A1 * | 3/2016 | H01R 13/6593 |
| EP | 3396791 | A1 * | 10/2018 | H01R 13/18 |
| EP | 3540865 | A1 * | 9/2019 | H01R 13/18 |
| EP | 3403296 | B1 * | 6/2020 | H01R 9/0518 |
| EP | 3783754 | A1 | 2/2021 | |
| TW | I669861 | B | 8/2019 | |

* cited by examiner

ELECTRICAL CONNECTOR WITH AN IMPROVED SHIELDING TUBE

BACKGROUND OF THE INVENTION

Field of the Invention

The present invention relates generally to an electrical connector with an improved shielding tube.

Description of Related Arts

China Patent No. CN214542783U discloses a car Ethernet electrical connector for high speed transmission, which includes a plug connector and a receptacle connector. The receptacle connector includes an inner insulator retaining the terminals and a cast shell, the insulator is inserted and retained in the cast shell. The connector may not meet a higher speed transmission performance. An improved electrical connector is desired.

SUMMARY OF THE INVENTION

An object of the present invention is to provide an electrical connector with an improved shielding tube.

To achieve the above-mentioned object, an electrical connector comprises: a first housing defining a front face and a rear face and two holes running through the front face and the rear face; a pair of terminals received in the holes respectively and extending forward but behind the front face of the first housing; and a first shield tube fitly surrounding the first housing; wherein the first shielding tube defines a front distal portion located in front of the front face of the first housing, and the front distal portion shrinks gradually and becomes smaller in diameter.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
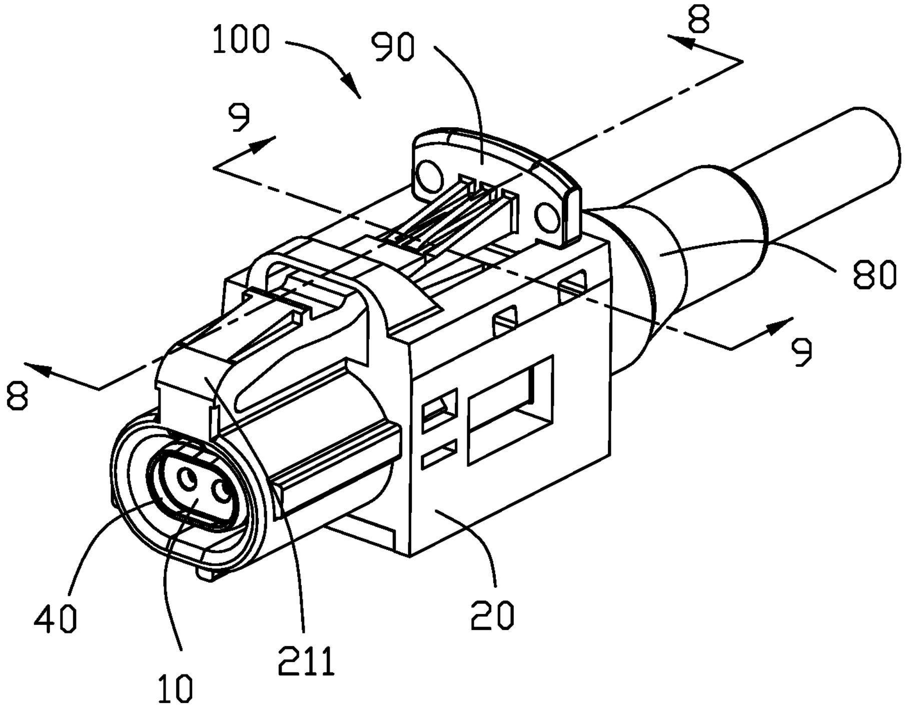
FIG. 1 is a front and top perspective view of an electrical connector according to a first embodiment of this present invention.

Reference will now be made to the drawing figures to describe the preferred embodiment of the present invention in detail.

Referring to FIGS. 1-9 illustrating an electrical connector 100 of a first embodiment of this present invention, the electrical connector 100 is used to a high speed transmission in vehicles and requires a shielding performance. The electrical connector 100 includes a first housing 10 and a first shielding shell 40 surrounding the first housing 10 and a pair of terminals 30 retained in the first housing 10 and connecting with a pair of cables 71.

Figure 4:
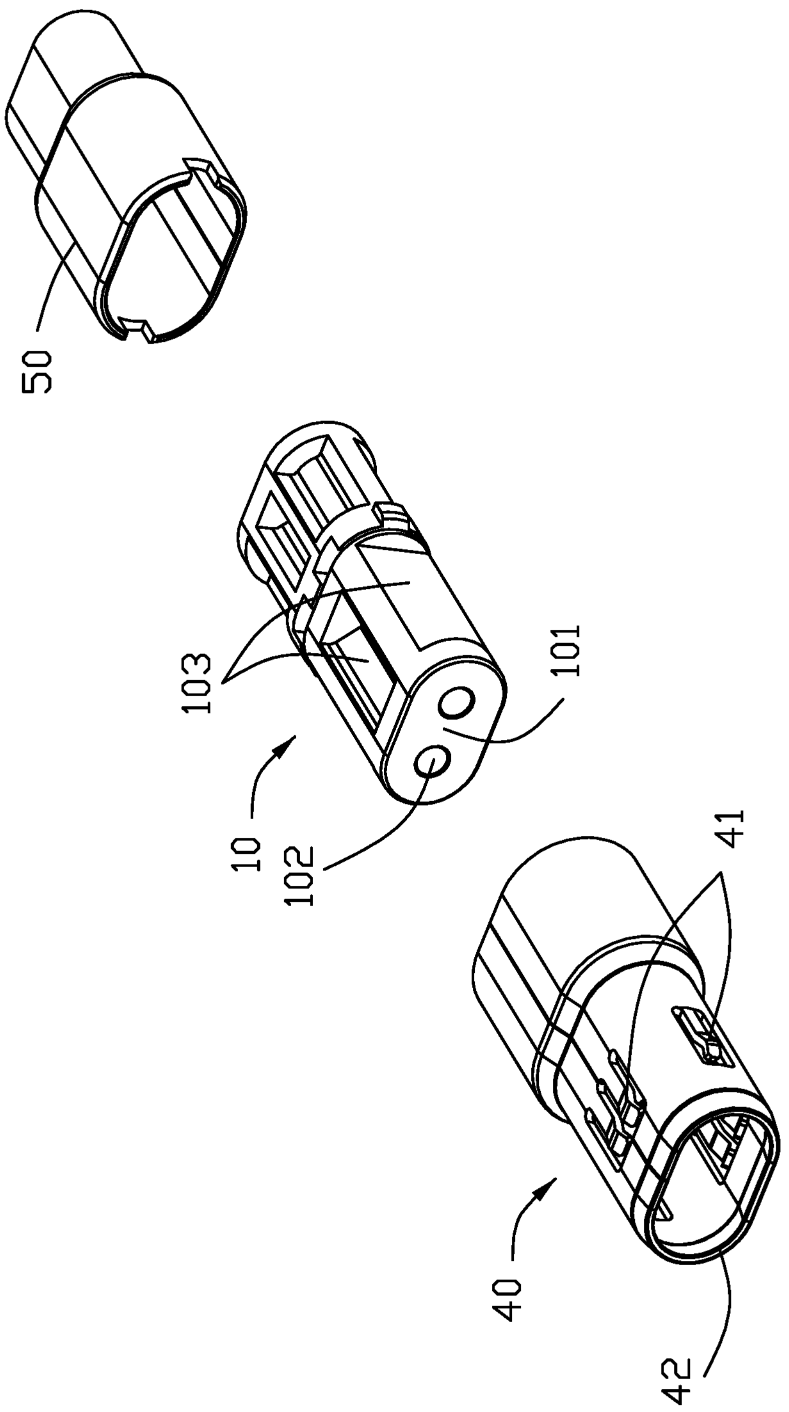
FIG. 4 is an exploded perspective view of a first shielding tube, a first housing and a second shielding tube in FIG. 2.
Figure 5:
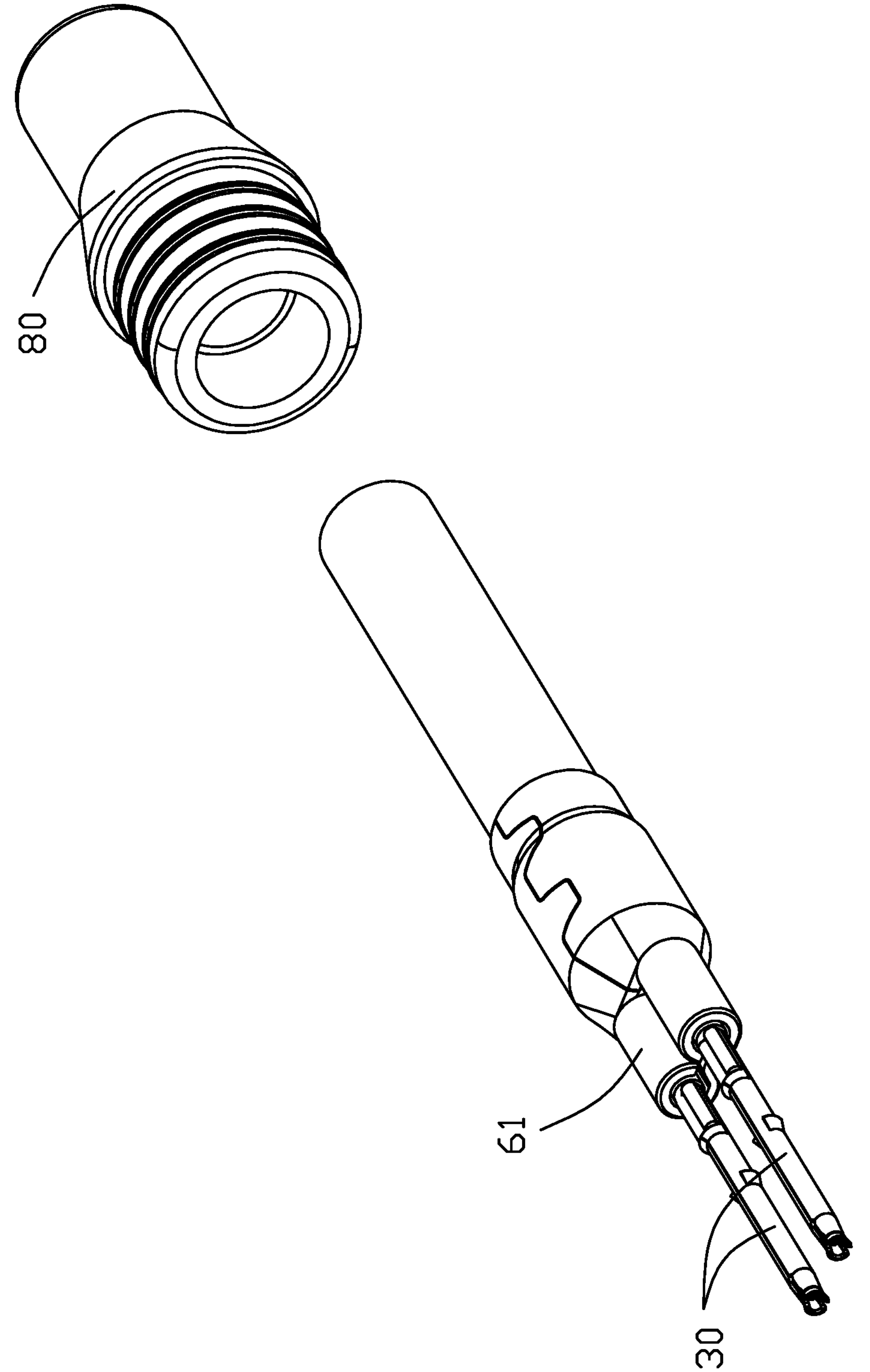
FIG. 5 is an exploded perspective view of a cable assembly with a third shielding tube and a stress-relieving member in FIG. 2.
Figure 6:
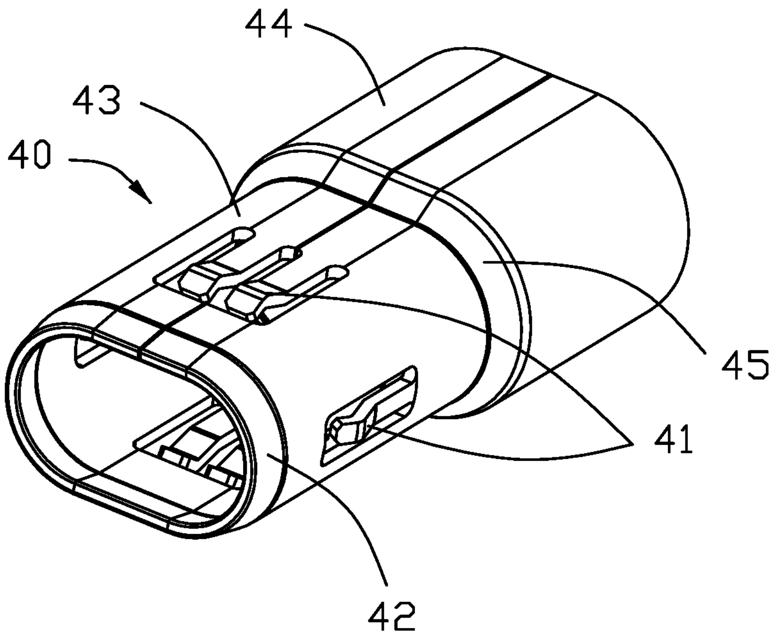
FIG. 6 is a perspective view of the first shielding tube in FIG. 4.
Figure 7:
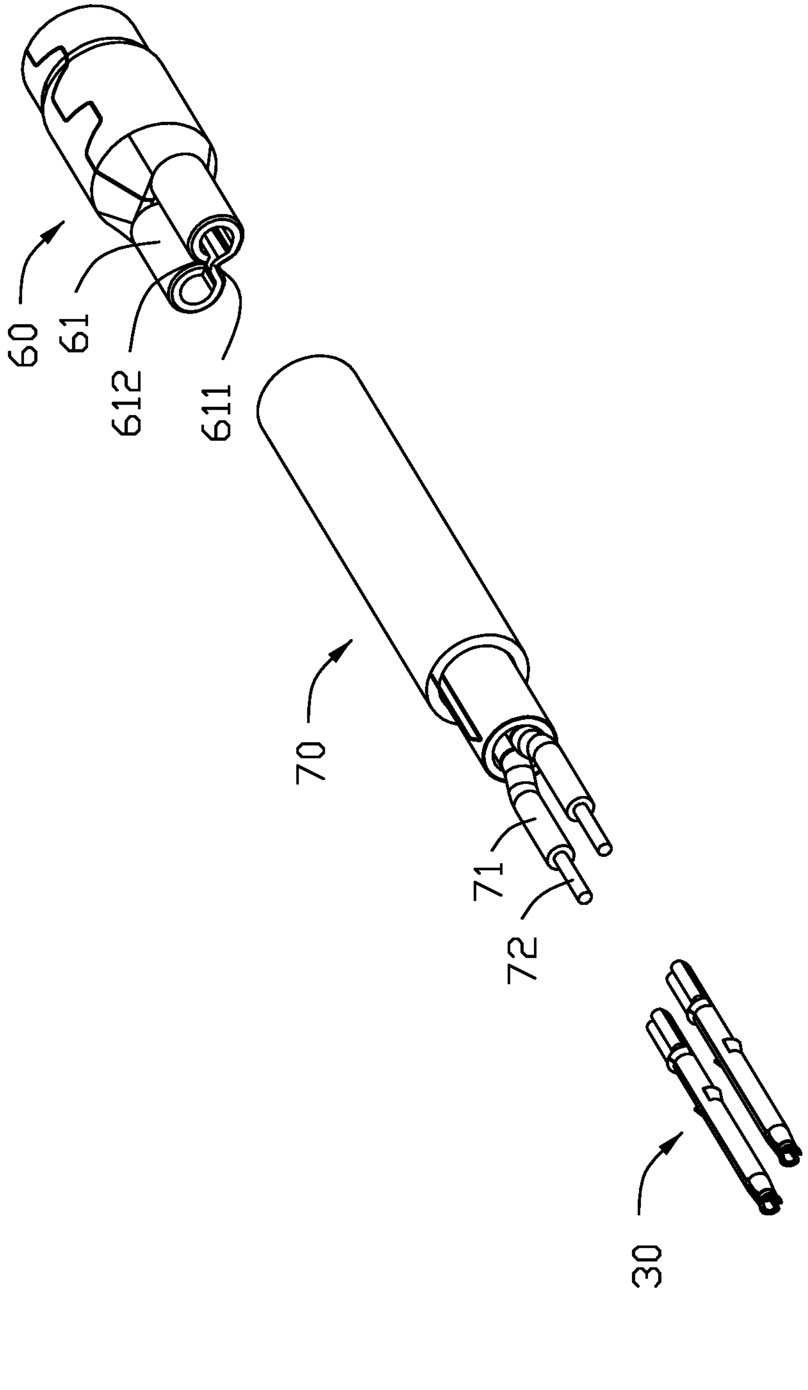
FIG. 7 is an exploded perspective view of the cable assembly with the third shielding tube in FIG. 5.
Figure 8:
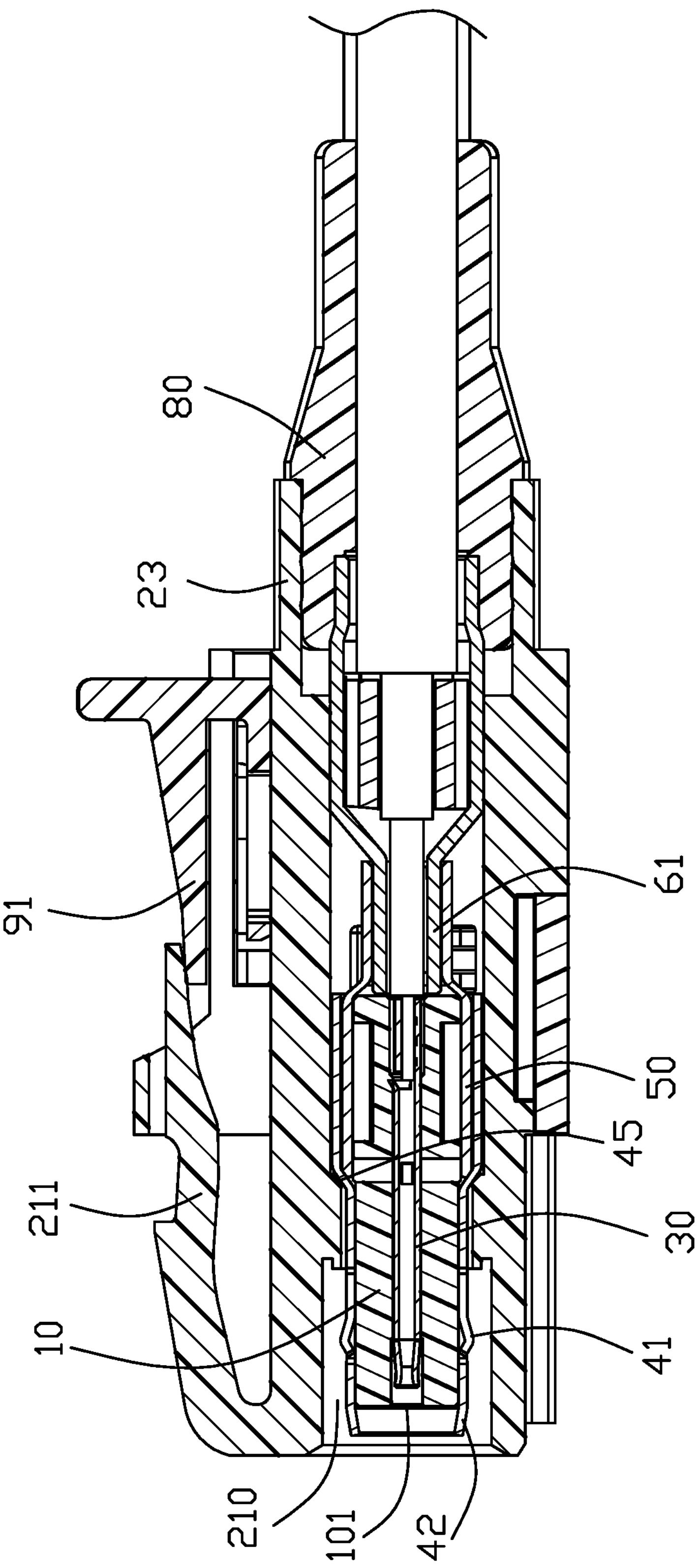
FIG. 8 is a cross-sectional view of the electrical connector taken along a broken line 8-8 in FIG. 1.

Referring to FIGS. 4-5, the first housing 10 is made from insulating material and formed by injection-molded process, which defines a front face 101 and a rear face and a pair of holes 102 running through the front face and the rear face thereof. The terminals 30 are received in the holes 102 and located behind the front face 101 as clearly shown in FIG. 8. The first shielding shell/tube 40 surrounds an outer face of the first housing. The first shielding tube 40 define a plurality of elastic arms 41, the elastic arms 41 connect with the first shielding tube 40 at the rear ends thereof and disconnect from the first shielding tube at the front ends thereof. The first housing 10 defines recesses 103 corresponding to the elastic arms 41 one by one, so that the elastic arms 41 move into the recesses 103 after the elastic arms 41 move inwards. In this embodiment, the four side walls of the first shielding tube 40 define the elastic arms 41, two elastic arms 41 at each of the upper wall and the lower wall of the first shielding tube 40 and one elastic arm 41 at each of the right wall and the left wall of the first shielding tube 40. Referring to FIG. 6, the front distal portion 42 of the first shielding tube 40 shrinks gradually and becomes smaller in diameter to be a shrinking portion, the front distal portion 42 protrudes forwards beyond the front face 101 of the first housing 10. The front distal portion 42 can be formed by a drawing process and gradually becomes smaller in diameter, so as to better surround the first housing 10 and the terminals 30, and improve high frequent performance. Further, as shown in FIG. 6 and FIG. 8, the first shielding tube 40 includes the front distal portion 42, a front portion 43 and a rear portion 44, the front distal portion 42 directly extends from the front portion without any jump in diameter, the rear portion 44 is larger than the middle portion 43 with a jump in diameter, that means, the rear portion 44 and the front portion 43 are united together with a slantwise transitioning portion 45. The elastic arms 41 separate from a root of the front distal portion 42 with a distance.

Figure 2:
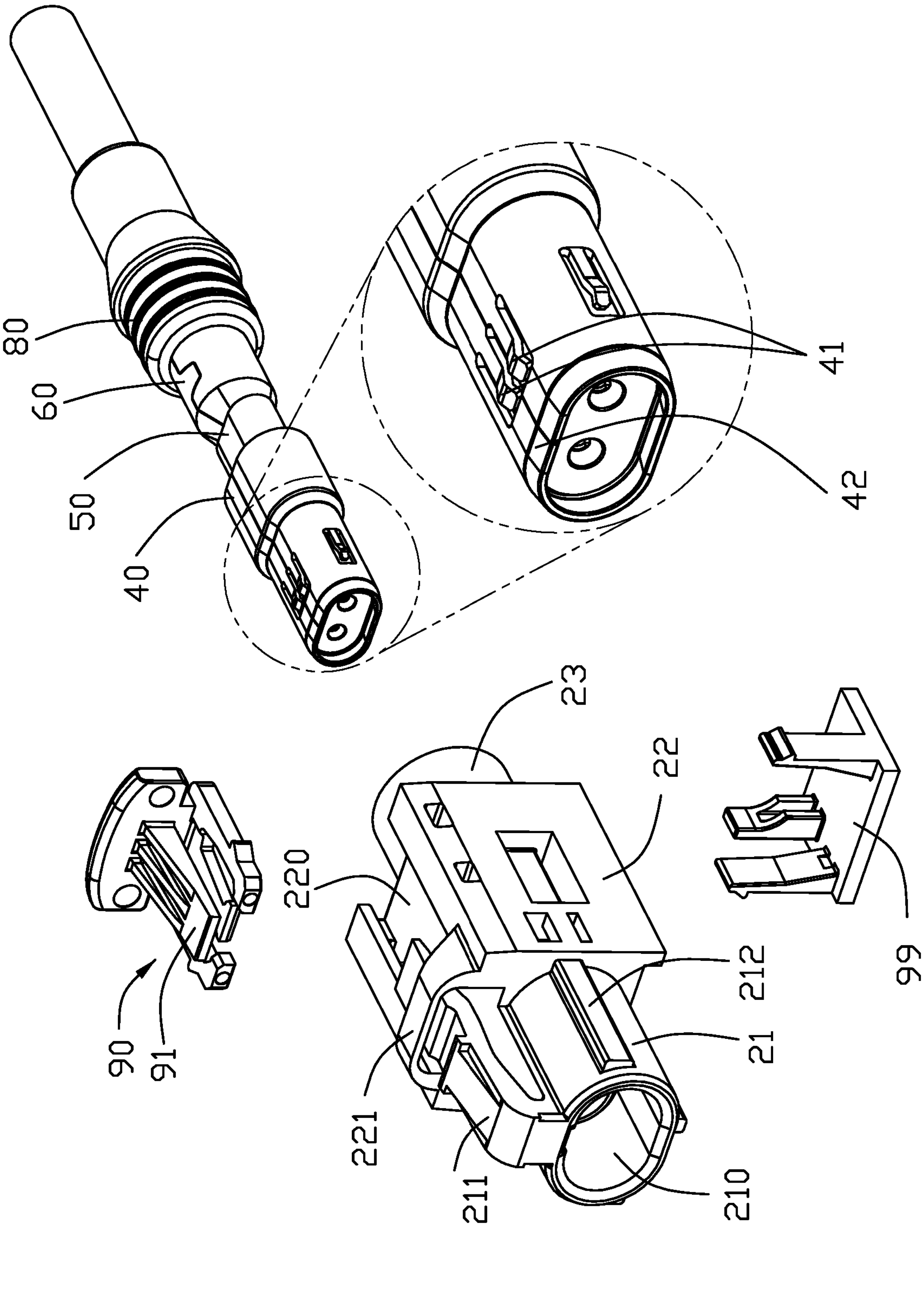
FIG. 2 is a front and top exploded perspective view of the electrical connector in FIG. 1.
Figure 3:
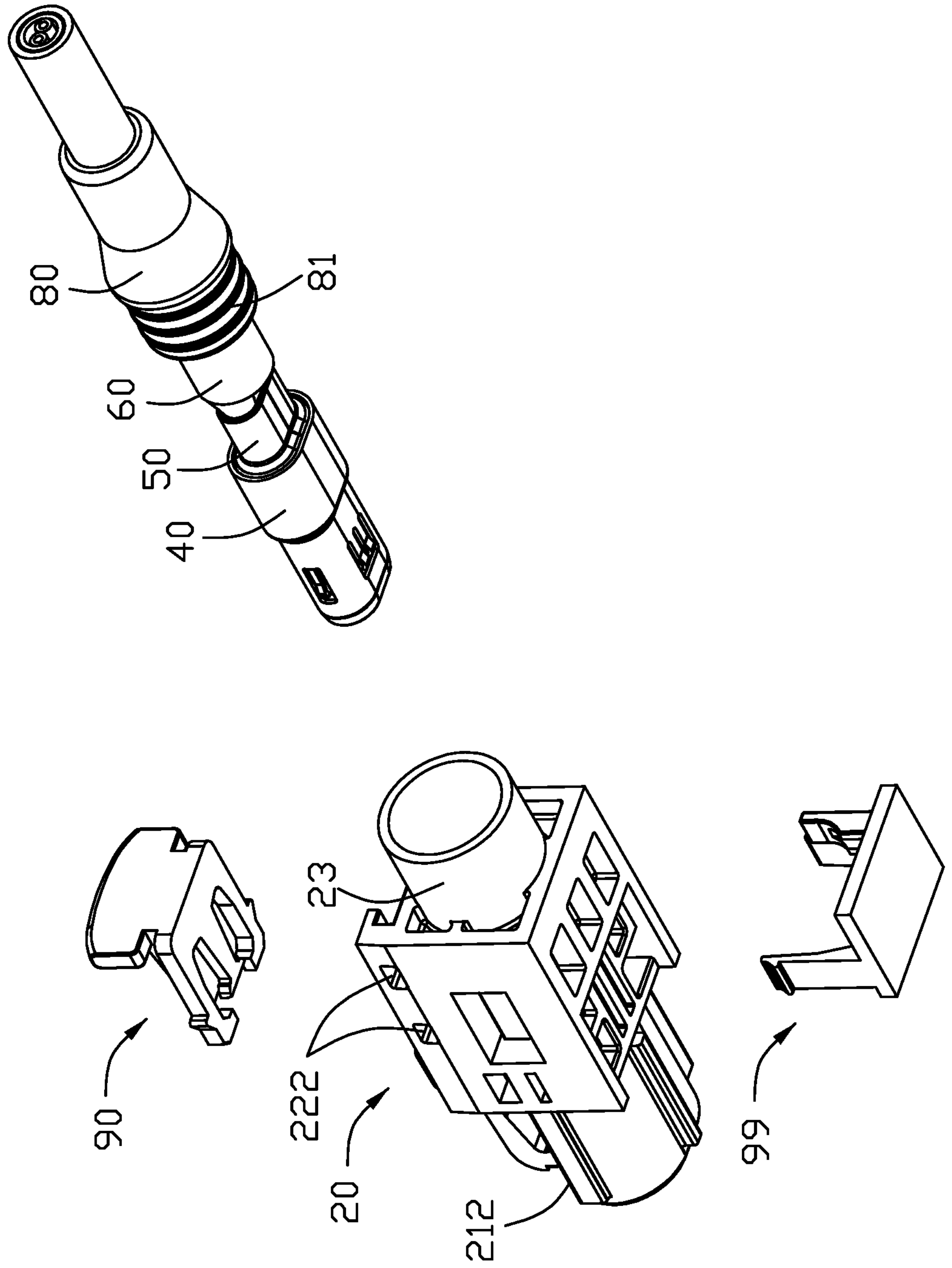
FIG. 3 is a lower and rear exploded perspective view of the electrical connector in FIG. 2.
Figure 9:
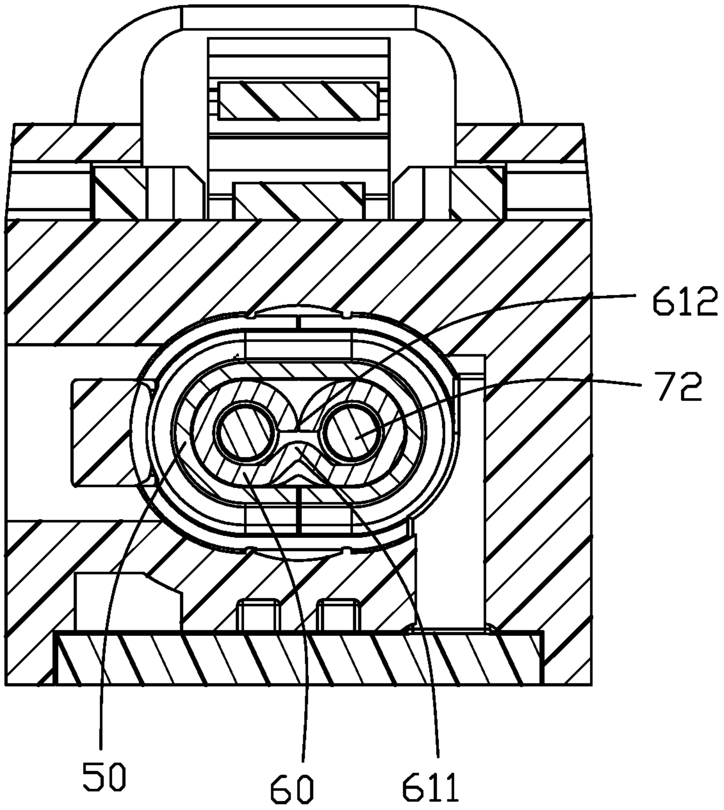
FIG. 9 is a cross-sectional view of the electrical connector taken along a broken line 9-9 in FIG. 1.

Referring to FIGS. 4-7, the electrical connector 100 includes a cable assembly 70 connecting with the terminals 30, and a second shielding shell/tube 50 and a third shielding shell/tube 60. The second shielding tube 50 connects with the first shielding tube 40 and the third shielding tube 60. The overlapping areas of the three shielding tubes are fixed together by welding. The cable assembly 70 includes two cables 71 parallel to each other, each cable 71 have an exposed conductive wire 72 retained with the rear ends of the terminals 30. The third shielding shell 60 defines a wrapping portion 61 extending forwards, the wrapping portion 61 is shaped with a figure of 8 with two tubes. The two tubes fitly surround the cables, as shown in FIG. 9 respectively. A lower wall of the wrapping portion 61 curves upward in an inverted V shape at a middle point in a front to rear direction, thereby forming a V-shape section 611. An upper wall of the wrapping portion 61 splits in two pieces at a middle point in the front to rear direction, and the right upper portion and the left upper portion both arc downward. Understandingly, there might be a gap 612 between the right upper portion and the left upper portion. The rear portion of the second shielding tube 50 surrounds the wrapping portion 61 of the third shielding tube 60, the second shielding tube 50 covers corresponds the gap 612. The front portion of the second shielding tube 50 surround a rear end of the first housing 10 and is surrounded by the first shielding tube, as shown in FIG. 2 and FIG. 8.

The cable assembly 70 is equipped with a stress relieving member 80, which is set on a rear portion of the cable assembly 70. The stress-relieving member 80 defines a plurality of protruding rings 81. The cable assembly 70 with the terminals and the shielding tubes is set in a second housing 20, the second housing 20 defines a rear tube portion 23, the stress-relieving member 90 is assembled and retained in the rear tube portion 23, the protruding rings 81 are interfered with the inside of the rear tube portion 23, as shown in FIG. 8. The first housing 10 and the three shielding tubes are assembled together and then inserted into the second housing 20, the stress-relieving member 80 and the cable assembly 70 are partially exposed to an exterior.

The second housing 20 defines a mating cavity 210 opening forwards by a ring wall 21, the ring wall 21 defines an arm-shaped locking portion 211 at an upper face thereof and some keying ribs 212 at opposite side face thereof. As shown in FIG. 8, the front distal portion 42 is disposed in the mating cavity 210 and extends forward but in the second housing 20. The distance between the front face of the front distal portion 42 and the front face 101 of the first housing 10 is larger than the distance between the front face of the front distal portion 42 and the front face of the second housing 20. The second housing 20 further includes a square middle portion 22 and the rear tube portion 23, the middle portion 22 defined a mounting groove 220 and a transverse beam 221, the locking portion 211 extends above the mounting groove 220 across the transverse beam 221, the transverse beam 221 also can avoid an over-movement of the locking arm 211 when the locking arm shift upwards. The middle portion 22 defines two L shape portions to surround the mounting groove.

The electrical connector 100 further includes a connector position assurance (CPA) 90 mounting on an upper portion of the second housing 20, and a terminal position assurance (TPA) 99 mounting on a lower portion of the second housing 20. The CPA 90 is assembled in the mounting groove 220 from a rear end thereof, the locking arm 211 presses against the CPA 90, against a board portion 91 extending forwards from an upright handle portion in this embodiment. The CPA 90 defines two mounting arms which are locked with two rear locking holes **22*s* located at opposite sides of the mounting grooves 220 when the CPA 90 is in an original statue. After the CPA 90 moves forwards, the mounting arms are locked with two front locking holes 222 and the board portion 91 blocks against the locking arms 211, resulting in the locking arms can not move downwards. Two arm portions of the TPA 99** are locked in the locking holes defined at opposite sides thereof.

The terminals 30 are connected with the cable assembly 70, then the third shielding tube 60 is assembled to the cable assembly 70 and then is inserted into the first housing 10. Then the second shielding tube 50, the first shielding tube 40 and the stress-relieving member 80 are assembled on the first housing 10, and then inserted into the second hosing 20. The CPA 90 and TPA 99 are assembled in the second housing 20.

Figure 10:
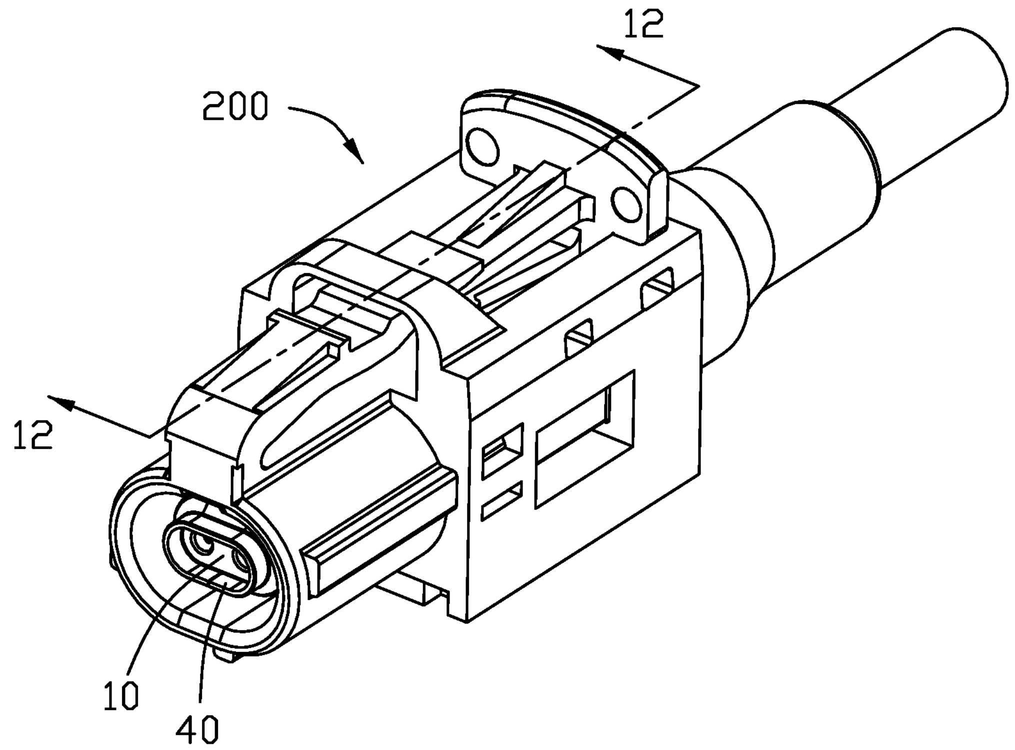
FIG. 10 is a perspective view of an electrical connector of a second embodiment of this present invention.
Figure 11:
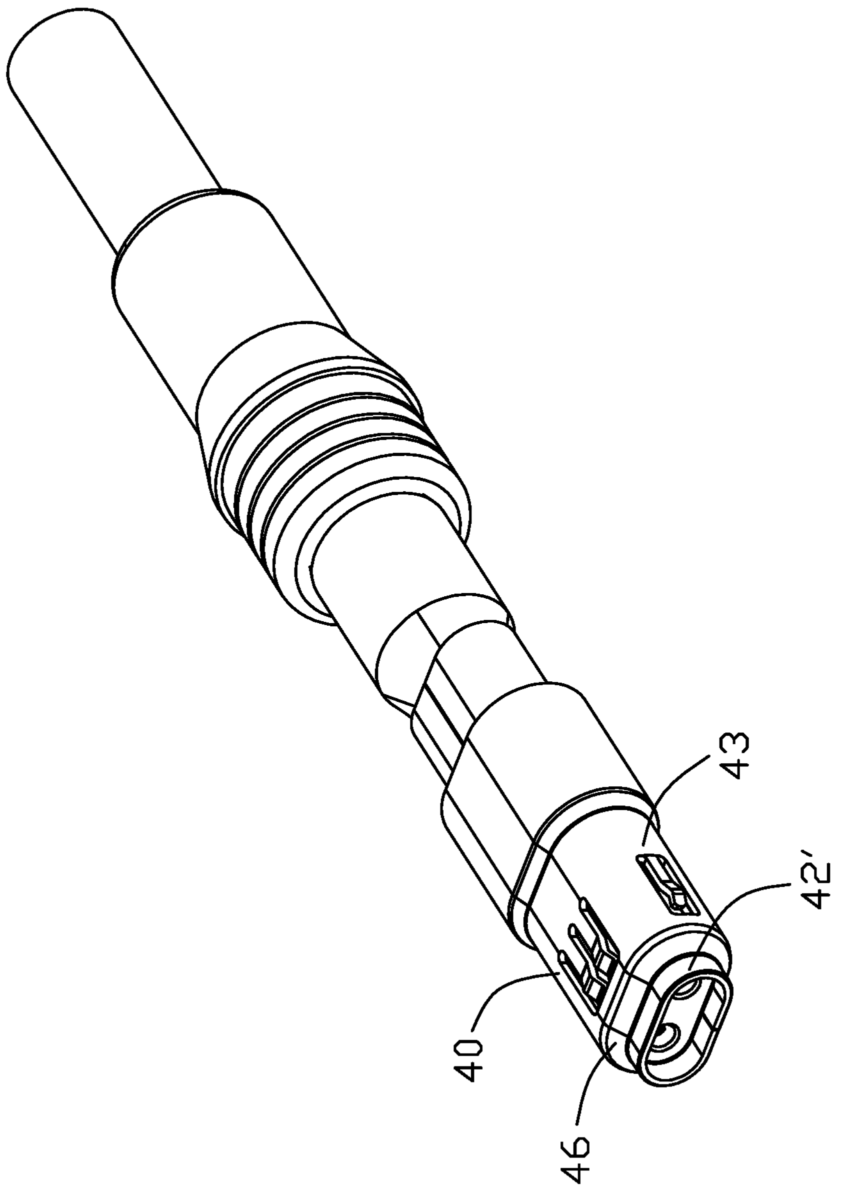
FIG. 11 is a perspective view of an electrical connector in FIG. 11 without a second housing.
Figure 12:
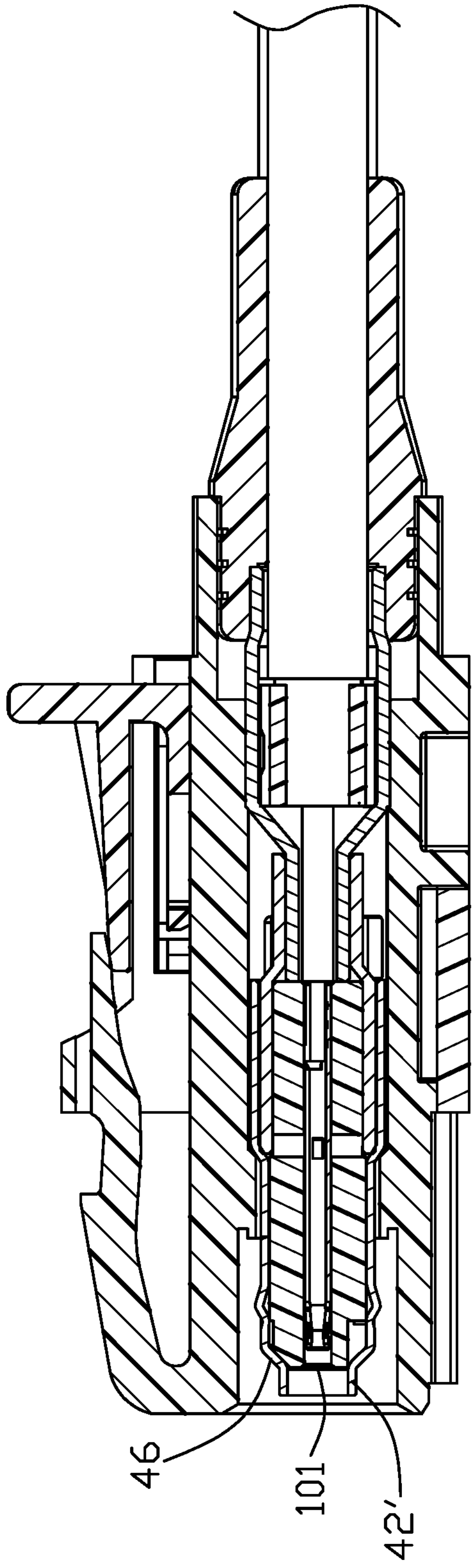
FIG. 12 is a cross-sectional view of the electrical connector taken along a broken line 12-12 in FIG. 10.
Figure 13:
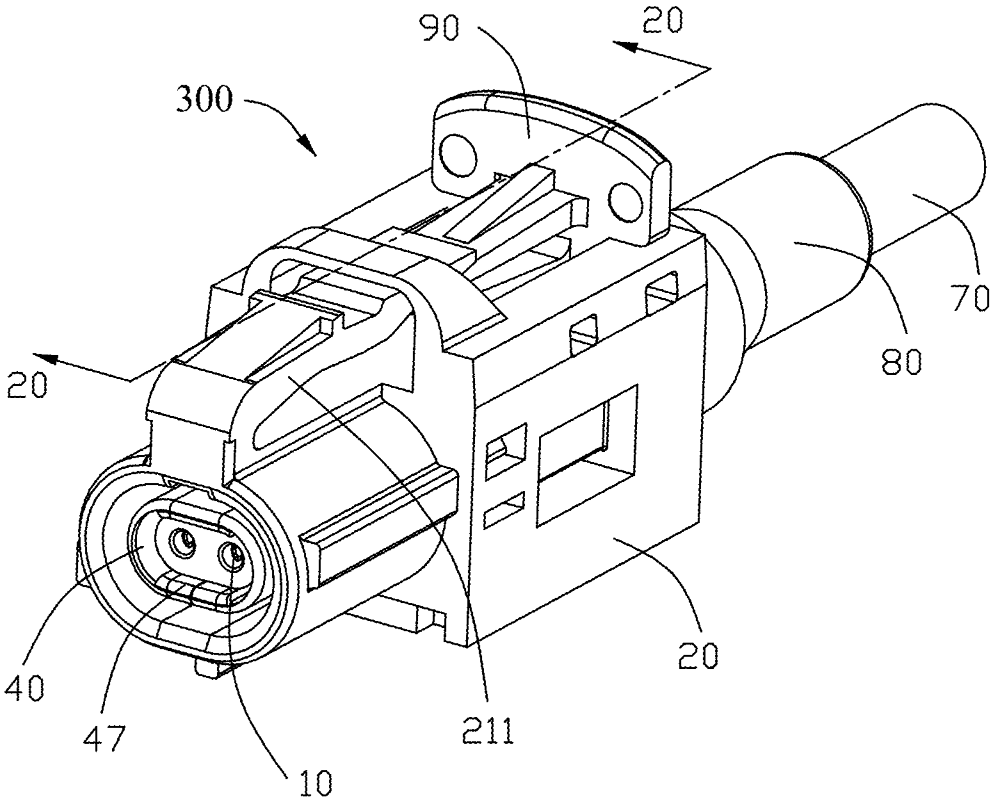
FIG. 13 is a front and top perspective view of an electrical connector according to a third embodiment of this present invention.
Figure 14:
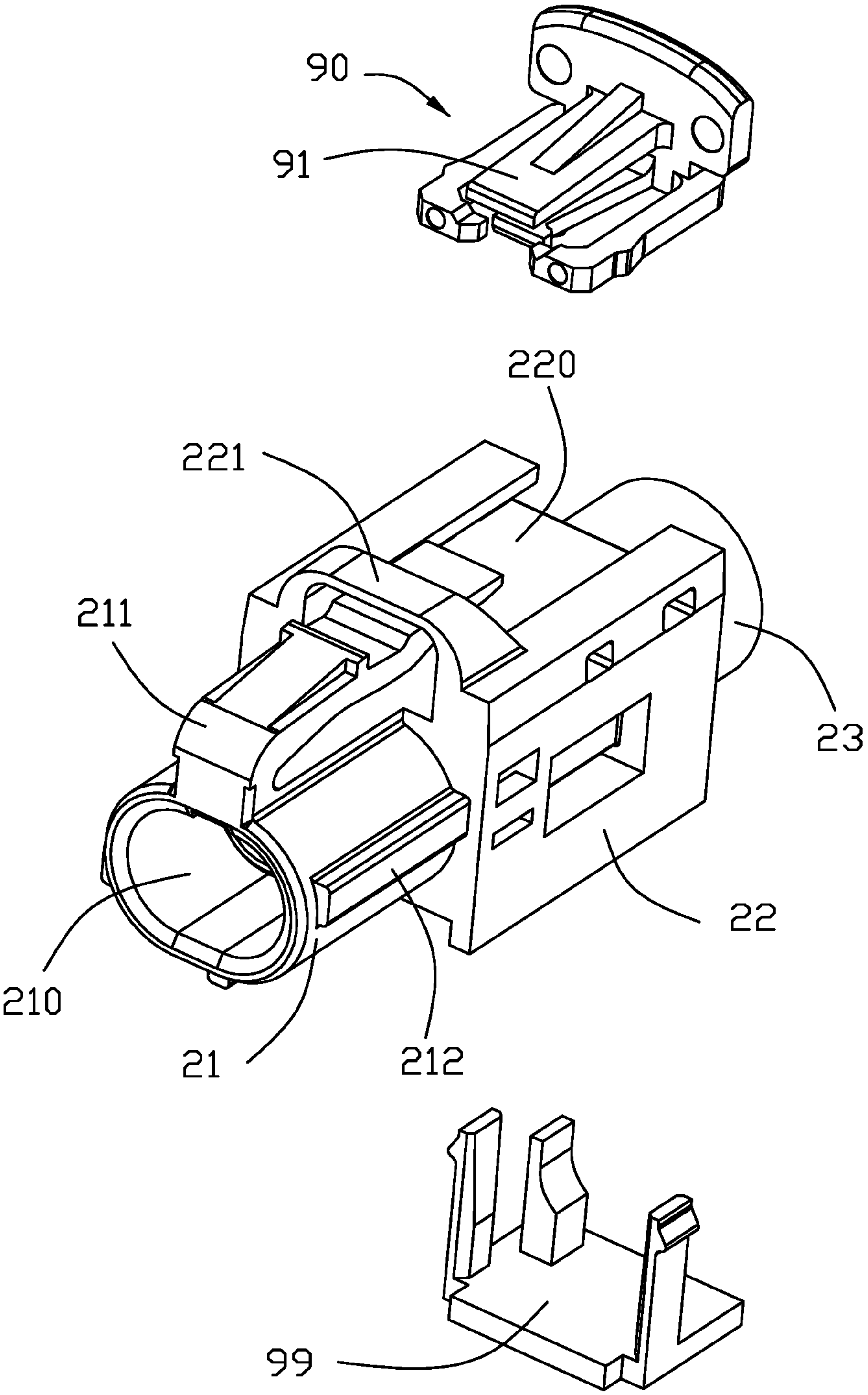
FIG. 14 is a front and top exploded perspective view of the electrical connector in FIG. 13.
Figure 15:
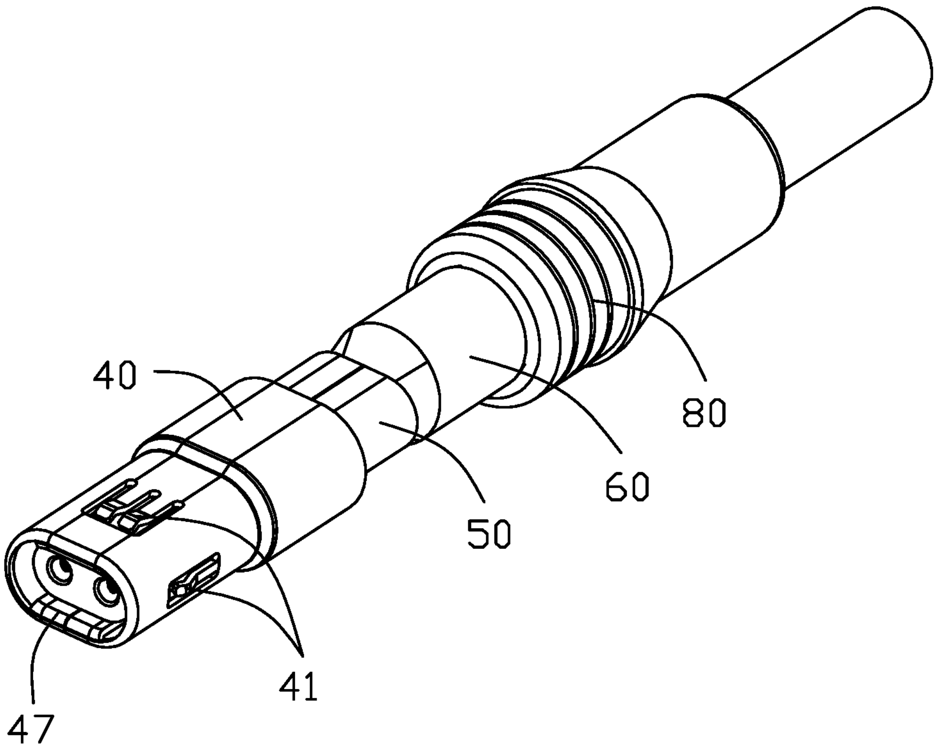
FIG. 15 is a perspective view of an electrical connector in FIG. 13 without a second housing.
Figure 16:
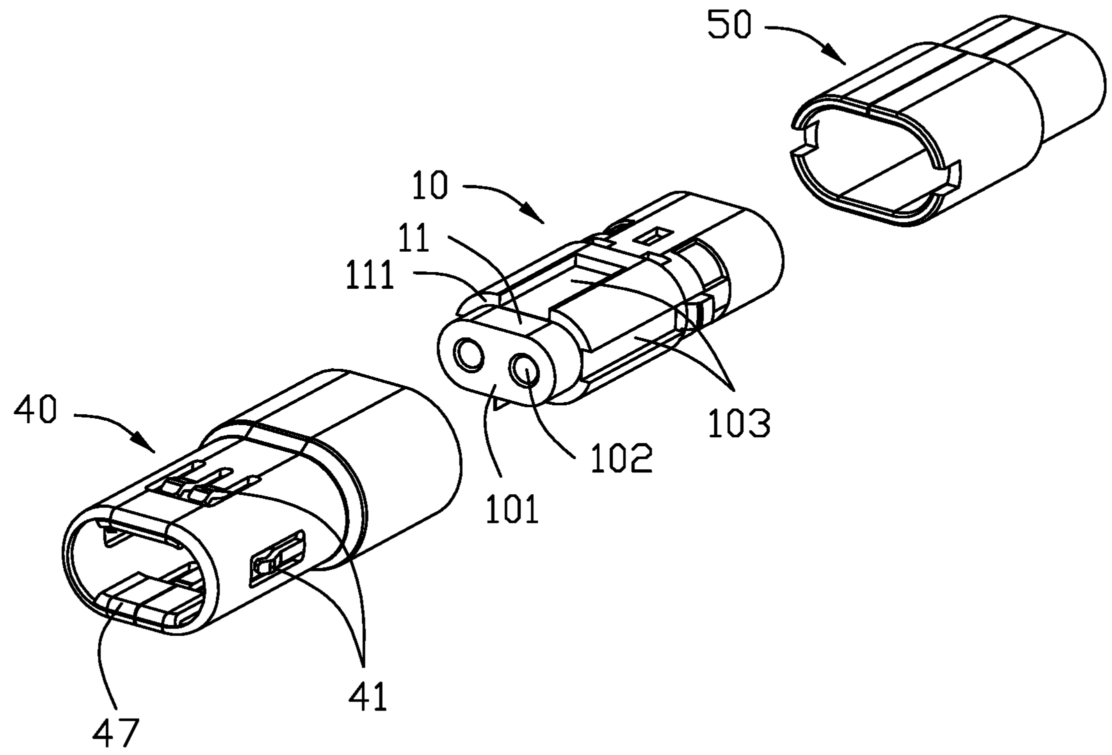
FIG. 16 is an exploded perspective view of a first shielding tube, a first housing and a second shielding tube in FIG. 15.
Figure 17:
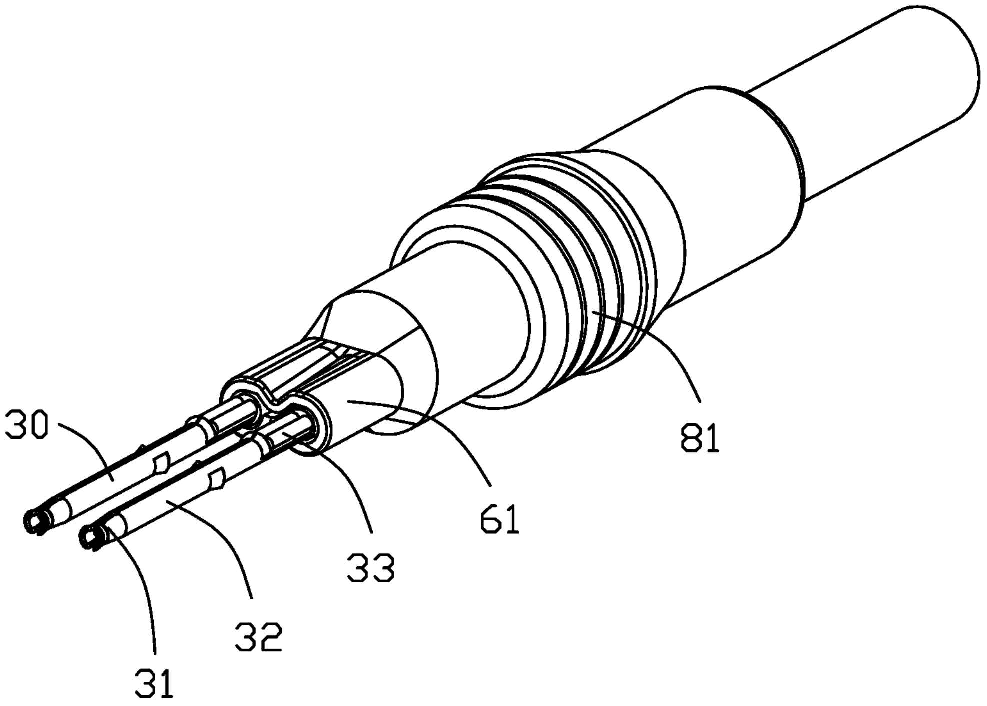
FIG. 17 is a perspective view of a cable assembly with a third shielding tube and a stress-relieving member in FIG. 15.

As shown in FIGS. 10-12, an electrical connector 200 of a second embodiment is illustrated, which is similar to the connector 100 of the first embedment, but the first shielding tube 40'. Please notes, the same elements are labeled with the same numerals. The first shielding tube 40 of the electrical connector 200 defines a front distal portion 42' at a front end thereof. The front distal portion 42' extends forwards in a horizontal level with a same diameter in the front-rear direction. The front distal portion 42' is united with the front portion 43 with a slantwise transitioning portion 46, the joint of the slantwise transitioning portion 46 and the front distal portion 42' is located in a same plane with the front face 101 of the first housing 10.

Figure 18:
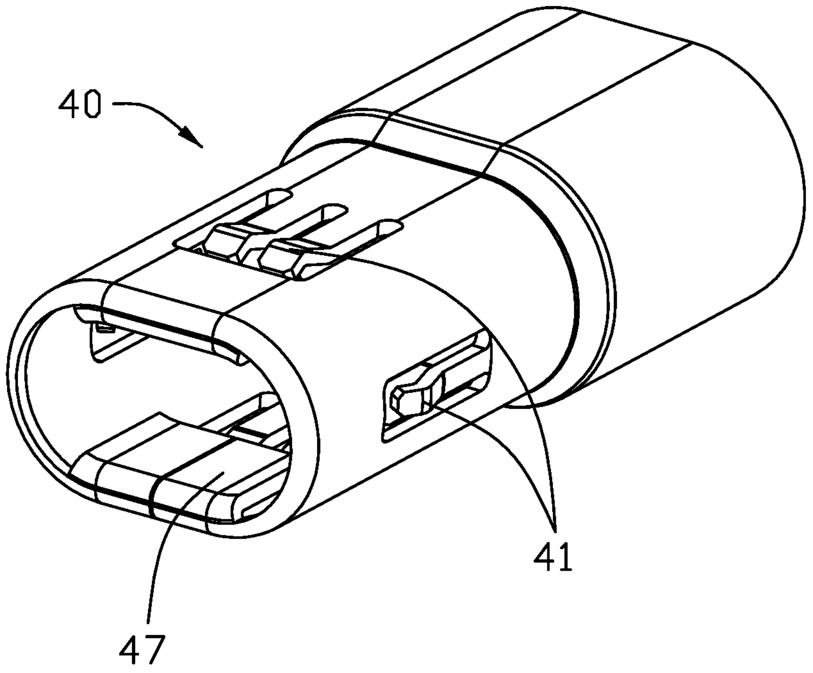
FIG. 18 is a perspective view of the first shielding tube in FIG. 16.
Figure 19:
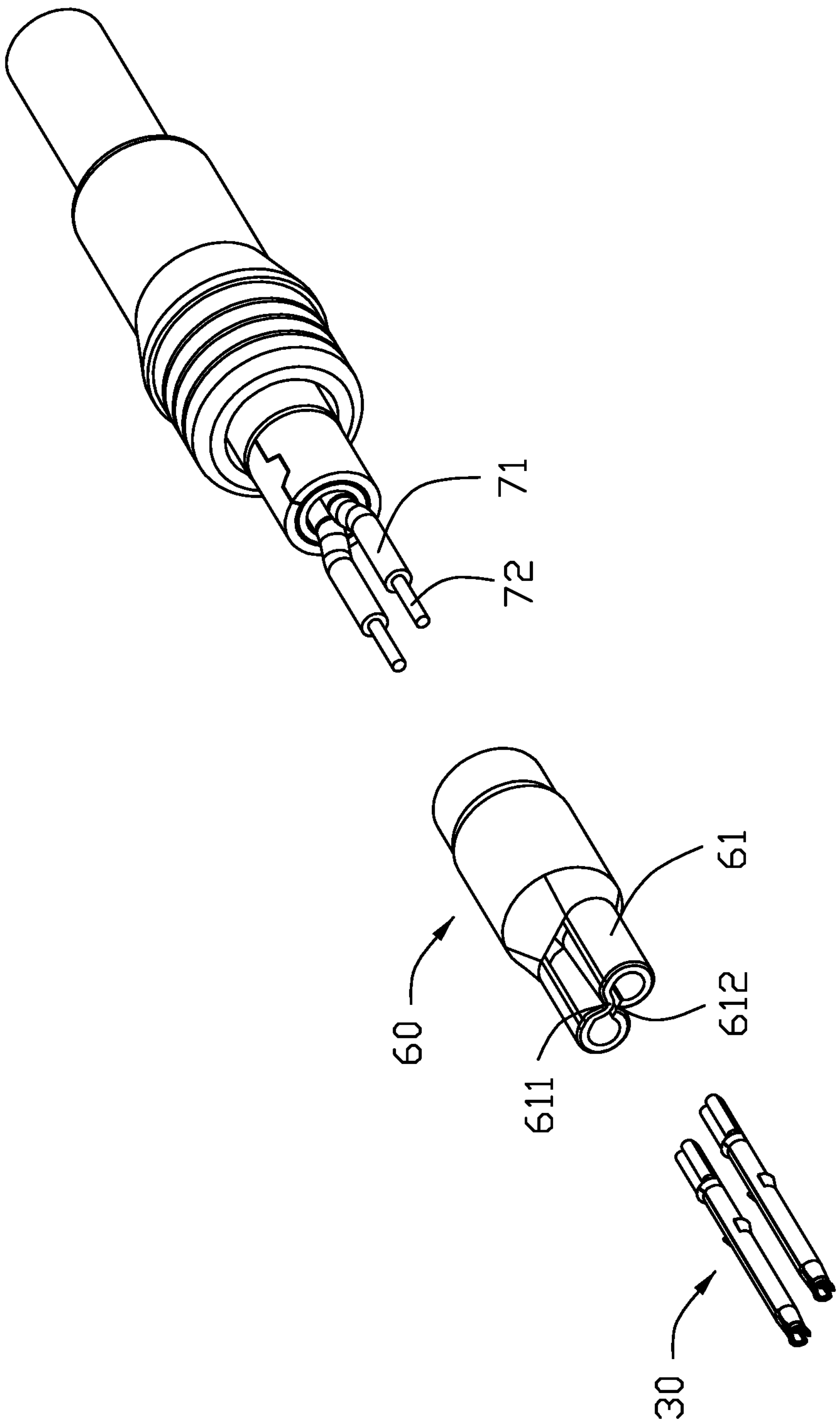
FIG. 19 is an exploded perspective view of the cable assembly with the third shielding tube in FIG. 17.
Figure 20:
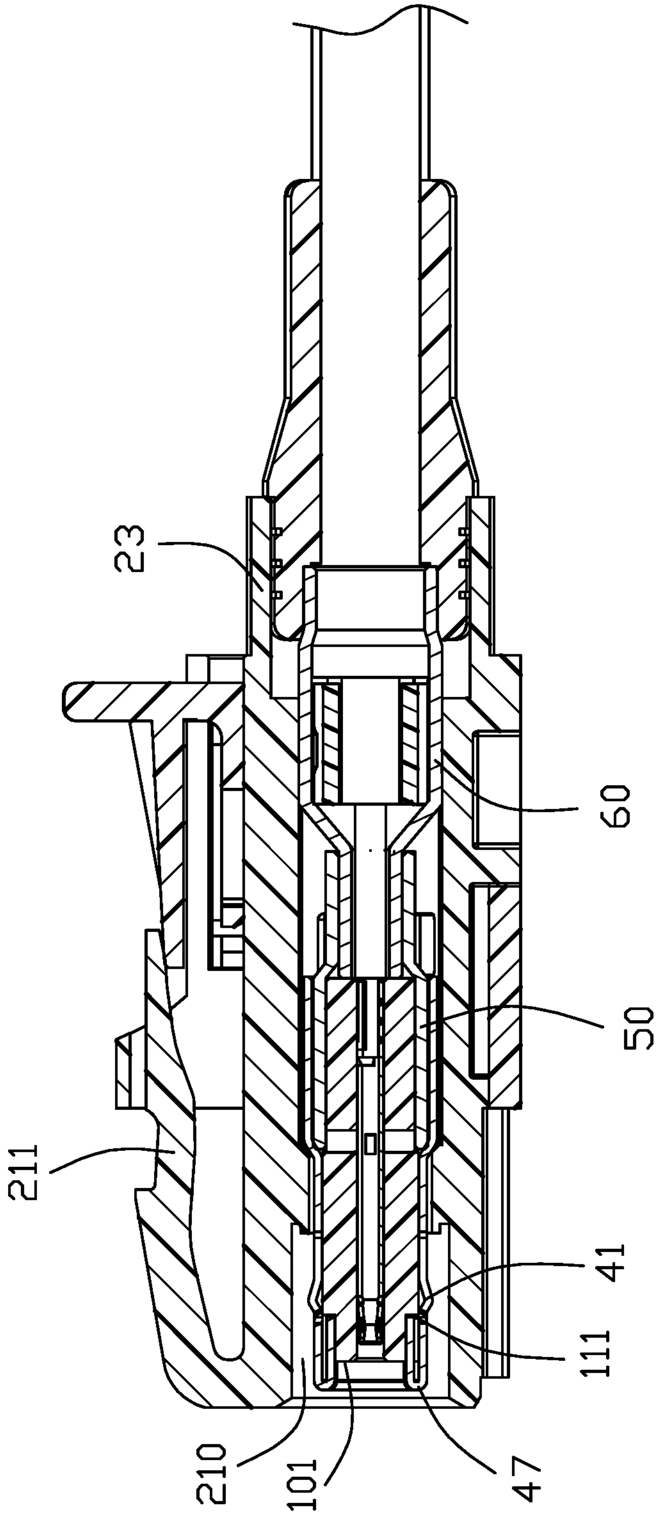
FIG. 20 is a cross-sectional view of the electrical connector taken along a broken line 20-20 in FIG. 13.
Figure 21:
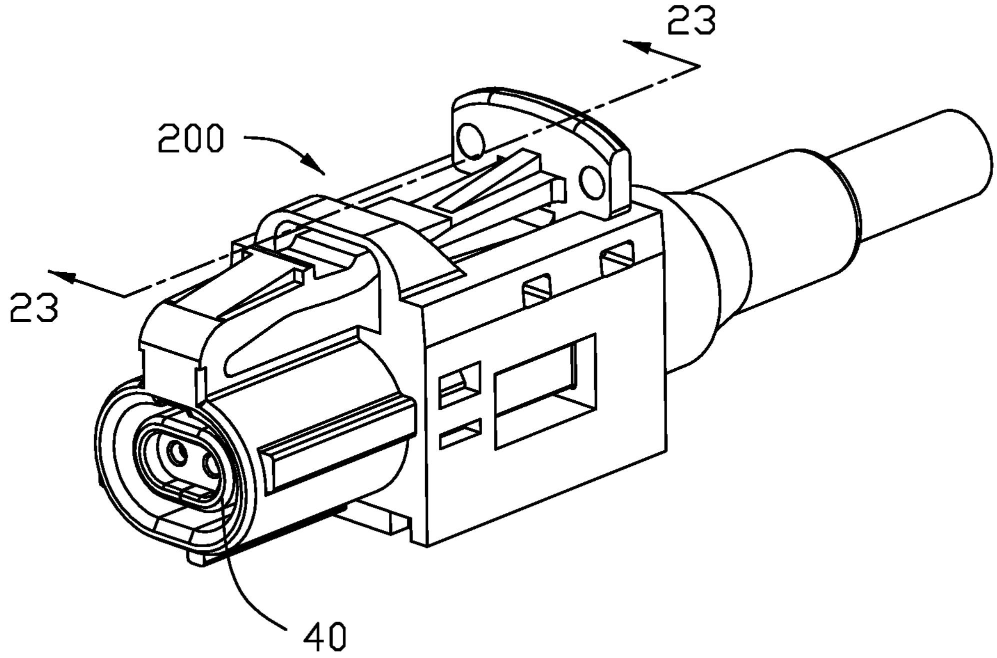
FIG. 21 is a perspective view of an electrical connector of a fourth embodiment of this present invention.
Figure 22:
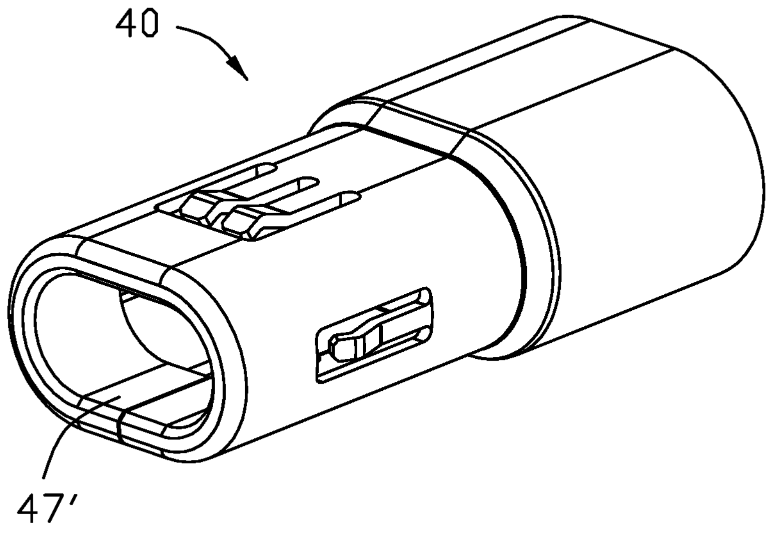
FIG. 22 is a perspective view of a first shielding tube in FIG. 21.
Figure 23:
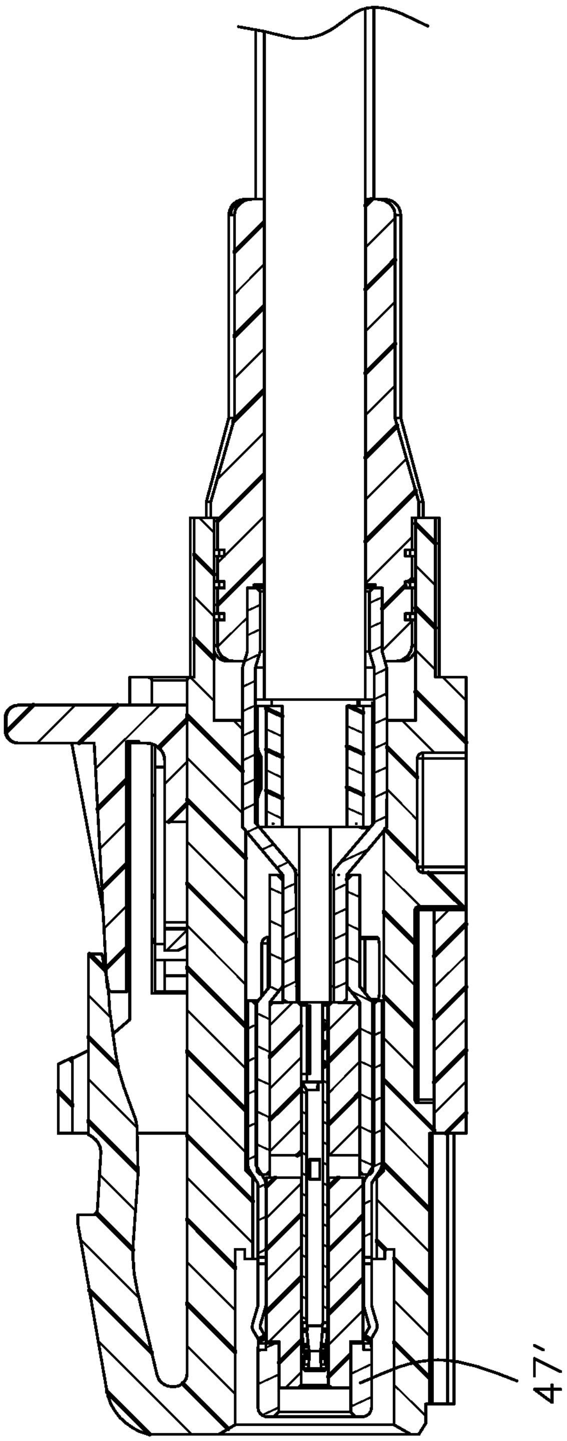
FIG. 23 is a cross-sectional view of the electrical connector taken along a broken line 23-23 in FIG. 21.

FIGS. 13-20 illustrating an electrical connector 300 of a third embodiment of this present invention, which is similar to the connector 100 of the first embedment, but the first shielding tube 40. Please notes, the same elements are labeled with the same numerals and description is omitted. The first housing defines a recessed portion 11 around a front periphery face with a stopping face 111 facing forwards. The periphery face is perpendicular to the front face thereof The recessed portion 11 runs through the front face 101 of the first housing. The recesses 103 are located behind but communicating with the recessed portion 11. The terminal 30 includes front contacting portion 31, a rear wrapping portion 33 and a middle portion 32 retained in the holes 102. The first shielding tube 40 defined an additional portion 47 at a front inside thereof, the additional portion 47 is received in the recessed portion press rearwards against the stopping face 111. As shown in FIG. 18, the additional portion 47 folds inside from a front edge of the first shielding tube 40. The additional portion 47 is of two-piece and located at an upper front inside and a lower upper front inside of the first shielding tube. A front face of the additional portion 47 is located in front of the front face 101 of the first housing 10. As shown in FIGS. 21-23, the additional portion 47' is thickened integrally at the front inside of the first shielding tube 40. The additional portion 47' is disposed around the front inside of the first shielding tube wholly.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

a first housing defining a front face and a rear face and two holes running through the front face and the rear face;

a pair of terminals received in the holes respectively and extending forward but behind the front face of the first housing;

a first shielding tube fitly surrounding the first housing; and a second housing receiving the first housing and the first shielding tube, the front distal portion being located behind a front face of the second housing;

wherein the first shielding tube defines a front distal portion located in front of the front face of the first housing, and the front distal portion shrinks gradually and becomes smaller in diameter; and a distance between the front face of the first housing and a front face of the front distal portion is larger than a distance between the front face of the front distal portion and the front face of the second housing.

2. The electrical connector as claimed in claim 1, wherein the first shielding tube defines a plurality of spring arms extending in a front-rear direction, the first housing defines a plurality of recesses to receive corresponding spring arms when the spring arms deform toward the recesses.

3. The electrical connector as claimed in claim 1, wherein the first shielding tube comprises a front portion and a rear portion, the front distal portion integrally extends from the front portion, the front portion defines two elastic arms at each of an upper wall and a lower wall thereof and one elastic arm at each of a right wall and a left wall thereof.

4. The electrical connector as claimed in claim 1, comprising a cable assembly and a third shielding tube, wherein the cable assembly comprises two cables connecting with the terminals, the third shielding tube defines a wrapping portion at a front portion thereof and fitly surrounding the two cables respectively.

5. The electrical connector as claimed in claim 4, wherein a lower wall of the wrapping portion curves upwards in an inverted V shape at a middle point in a front to rear direction, an upper wall of the wrapping portion splits in two pieces at a middle point in the front to rear direction and the two pieces arc downward.

6. The electrical connector as claimed in claim 1, comprising a second shielding tube, wherein a front portion of the second shielding tube overlaps a rear portion of the first shielding tube, a rear portion of the second shielding tube overlaps a front portion of the third shielding tube.

7. The electrical connector as claimed in claim 1, wherein the first shielding tube defines a plurality of elastic arms, the elastic arms separate from a root of the front distal portion with a distance.

8. The electrical connector as claimed in claim 1, comprising a connector position assurance and a terminal position assurance.

9. An electrical connector comprising:

a first housing defining a front face and two holes opening through the front face;

a pair of terminals receiving in the holes, respectively; and a first shielding tube fitly surrounding the first housing;

wherein the first housing defines a recessed portion around an outer periphery face perpendicular to the front face, the recessed portion opens forwards, and the first shielding tube defines at a front inside thereof an additional portion received in the recessed portion.

10. The electrical connector as claimed in claim 9, wherein the additional portion folds inside from a front edge of the first shielding tube.

11. The electrical connector as claimed in claim 10, wherein the additional portion is of two-piece and located at an upper front inside and a lower front inside of the first shielding tube.

12. The electrical connector as claimed in claim 9, wherein the additional portion is thickened integrally at the front inside of the first shielding tube.

13. The electrical connector as claimed in claim 12, wherein the additional portion is disposed around the front inside of the first shielding tube wholly.

14. The electrical connector as claimed in claim 9, wherein a front face of the additional portion is located in front of the front face of the first housing.

* * * * *